United States Patent

Fujiwara

[11] Patent Number: 5,608,759
[45] Date of Patent: Mar. 4, 1997

[54] INFORMATION STORAGE APPARATUS

[75] Inventor: Naoto Fujiwara, Tokyo, Japan

[73] Assignee: NEC Corporation, Tokyo, Japan

[21] Appl. No.: 267,388

[22] Filed: Jun. 29, 1994

[30] Foreign Application Priority Data

Jul. 2, 1993 [JP] Japan .................................. 5-188660

[51] Int. Cl.$^6$ ................................................ H03M 7/28
[52] U.S. Cl. .............................. 375/242; 341/88; 341/89
[58] Field of Search ........................... 375/240, 241, 375/242; 341/78, 88, 89, 106, 55

[56] References Cited

U.S. PATENT DOCUMENTS

| | | |
|---|---|---|
| 3,860,908 | 1/1975 | Stratton, III ........................... 340/89 |
| 5,028,923 | 7/1991 | Seki et al. ............................. 341/106 |
| 5,077,735 | 12/1991 | Myung et al. . |
| 5,303,343 | 4/1994 | Ohya et al. . |

FOREIGN PATENT DOCUMENTS 63-296446 12/1988 Japan .

Primary Examiner—Wellington Chin
Assistant Examiner—Jean B. Corrielus
Attorney, Agent, or Firm—Young & Thompson

[57] ABSTRACT

In a digital communication network in which pieces of information having different PCM coding rules are present, an information storage apparatus includes a control unit, a storage unit, and at least one transconverter. The control unit includes a comparator which compares the coding rule identifier read from the storage unit with a coding rule identifier of the read destination, when the control unit receives the information read request signal transmitted with the coding rule identifier of the read destination, so that if the coding rule identifier read out from the storage unit coincides with the coding rule identifier of the read destination, the PCM-coded information read out from the storage unit is transmitted without code conversion, and if the coding rule identifier read out from the storage unit does not coincide with the coding rule identifier, the PCM-coded information is transmitted through a selected transconverter to produce code-converted PCM-coded information.

4 Claims, 2 Drawing Sheets

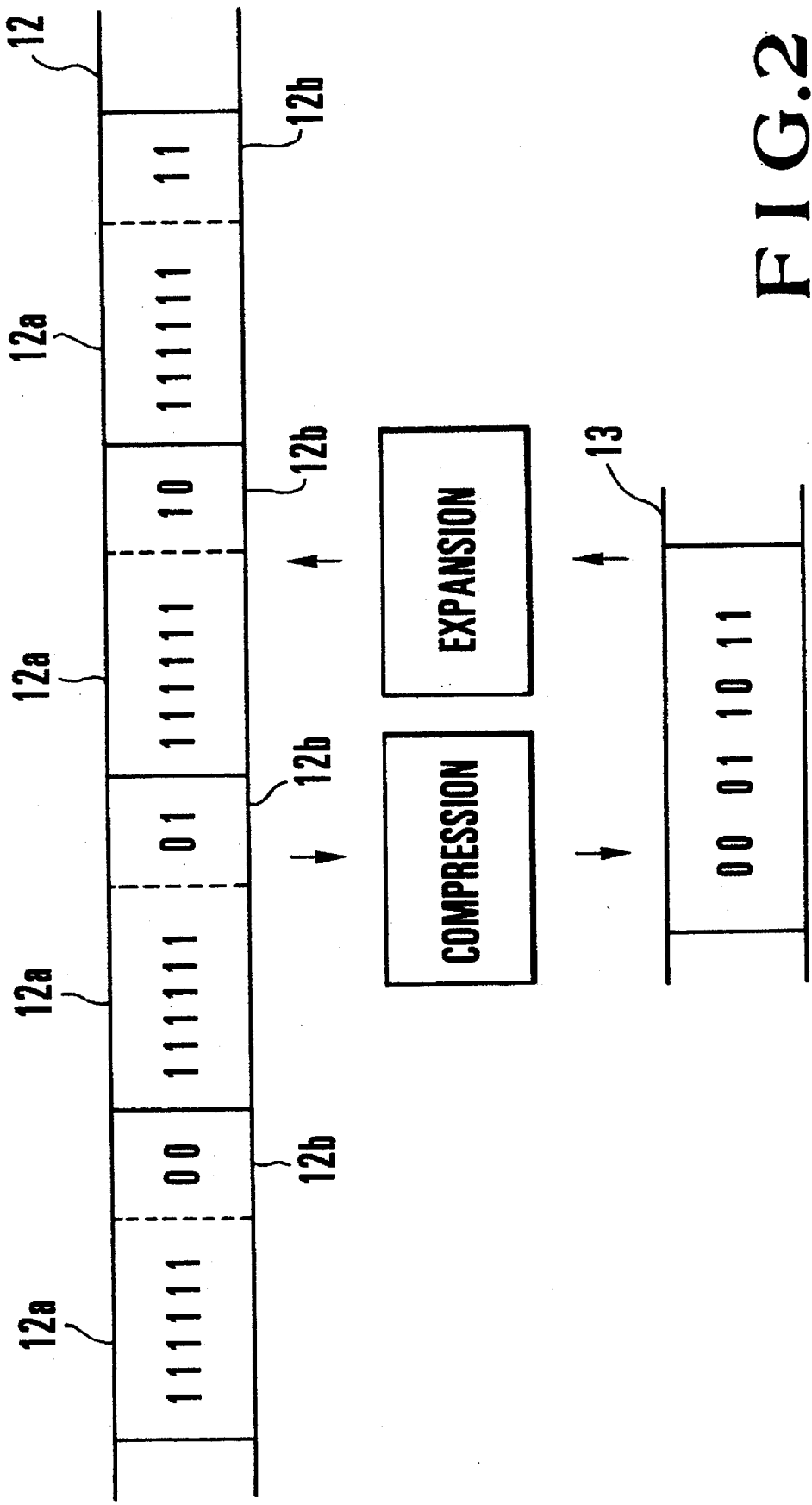

INFORMATION STORAGE APPARATUS

BACKGROUND OF THE INVENTION

1. Field of the Invention

The present invention relates to an information storage apparatus for storing/reproducing audio information such as speech or music information and, more particularly, to an information storage apparatus with speech coding and decoding functions.

2. Description of the Related Art

In a conventional information storage apparatus, although coding and decoding are performed before and after information storage, it is presumed that an original signal to be coded and a decoded/reproduced signal must have coding rules which coincide with each other. When the conventional information storage apparatus is connected to a digital channel in which pieces of information having different coding rules are present, the pieces of information are normalized and then stored because the coding rule of a read destination is not confirmed.

In particular, even when the coding rule of a storage source coincides with the coding rule of a read destination, when information is transmitted through an information storage apparatus for coding the information to normalize it and decoding the normalized code, audio quality obtained after reproduction is degraded compared with that obtained when communication is performed without going through an information storage apparatus.

For example, in a digital mobile communication switching unit for Japan and USA, a μ-law·PCM code is applied on a communication channel between the digital mobile communication switching unit and a fixed network. A low-rate code such as a VSELP code is used between the digital mobile communication switching unit and a mobile unit. In communication between the terminal of the fixed network and the mobile unit, μ-law-VSELP code conversion is performed through a transcoder. In communication between mobile units, no conversion is performed, and so-called "codec through connection" is performed to avoid quality degradation caused by the conversion. However, when a storage apparatus is connected to such a switching unit, quality degradation is inevitable.

On the other hand, in order to effectively use a storage unit, the following system (e.g., Japanese Patent Laid-Open No. 63-296446) is provided. That is, a coding rule is switched to a desired compressing/coding rule in accordance with the request of a customer, and audio information is compressed and coded and then stored in the storage unit. During reproduction, information read from the storage unit is reproduced by a decoding unit using a coding rule corresponding to the compressing/coding rule.

However, when a conventional information storage apparatus is connected to a digital channel in which pieces of information having different coding rules are present, the coding rule of a storage source used when the information is stored in the storage apparatus may not correspond to the coding rule of a read destination for reproducing information read out from a storage unit. For this reason, code conversion must be performed, thereby degrading communication quality.

SUMMARY AND OBJECTS OF THE INVENTION

In the information storage apparatus according to the present invention, when an information storage request signal is received, PCM-coded information received through a channel and the coding rule identifier of the PCM-coded information are stored in the storage unit in correspondence with each other. In addition, the information storage apparatus receives an information read request signal and the coding rule identifier of a read destination, and compares the coding rule identifier read out from the storage unit with the coding rule identifier of the read destination. If these identifiers coincide with each other, the PCM-coded information read out from the storage unit is transmitted without conversion; if these identifiers do not coincide with each other, a transconverter for code-converting the PCM-coded information having the coding rule of the source code into PCM-coded information having the coding rule of the read destination is selected by a selection unit, and the converted PCM-coded information is transmitted.

It is an object of the present invention to provide an information storage apparatus capable of assuring communication quality equal to that obtained when direct communication is performed between a storage source and a read destination.

In order to achieve the above object, according to the present invention, there is provided, in a digital communication network in which pieces of information having different PCM coding rules are present, an information storage apparatus comprising, a control means for receiving an information storage request signal with a coding rule identifier of a source and an information read request signal transmitted with a coding rule identifier of a read destination, a storage unit for storing PCM-coded information to be transmitted and a coding rule identifier of the PCM-coded information in correspondence with each other, when the control means receives the information storage request signal, and a transconverter for respectively converting the PCM-coded information different read out from the storage unit into code-converted PCM-coded information having the coding rule of the read destination, the control means including a comparator which compares the coding rule identifier read out from the storage unit with a coding rule identifier of the read destination, when the control means receives the information read request signal transmitted with the coding rule identifier of the read destination, so that if the coding rule identifier read out from the storage unit coincides with the coding rule identifier of the read destination, the PCM-coded information read out from the storage unit is transmitted without code conversion, and if the coding rule identifier read out from the storage unit does not coincide with the coding rule identifier, one of the code-converted PCM-coded information converted through the transconverter is transmitted.

BRIEF DESCRIPTION OF THE DRAWINGS

FIG. 2 is a view showing arrays of input/output bits of the compression and expansion units in FIG. 1.

DESCRIPTION OF THE PREFERRED EMBODIMENT

Figure 1:
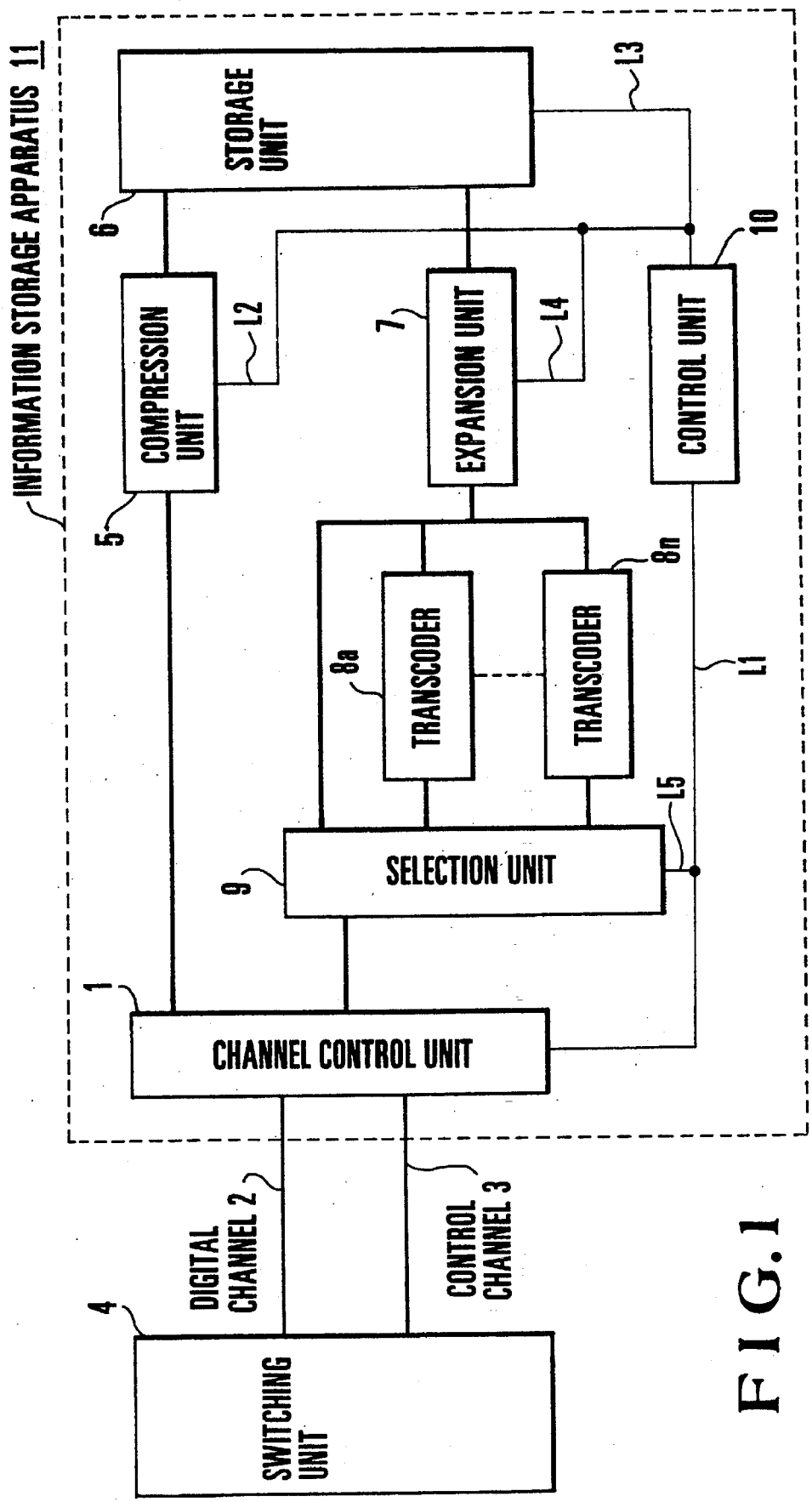
FIG. 1 is a block diagram showing an embodiment of an information storage apparatus according to the present invention.

FIG. 1 shows an embodiment of an information storage apparatus according to the present invention. For example, assuming a communication network using a digital synchronous transfer mode (STM), a CCITT No. 7 signal system is used to transmit/receive control information.

Referring to FIG. 1, reference numeral 1 denotes a channel control unit. This channel control unit 1 is connected to a switching unit 4 through a digital channel 2 and a control channel 3, and has a function of transmitting/receiving PCM-coded information and a coding rule identifier.

The digital channel 2 carries PCM-coded information. The control channel 3 carries control information such as an information storage request signal or an information read request signal from the switching unit 4 and a coding rule identifier corresponding to the PCM-coded information on the digital channel 2.

Reference numeral 5 denotes a compression unit. When the PCM-coded information transmitted from the switching unit 4 through the digital channel 2 includes redundant bit data, this compression unit 5 outputs the information as information compressed by removing the redundant bit data from the transmitted information. When the PCM-coded information includes no redundant bit data, the compression unit 5 outputs the transmitted information without changing it. Outputs of the compression unit 5 are sent to the storage unit 6 for storage therein.

Reference numeral 6 denotes a storage unit; and 7, an expansion unit. When PCM-coded information read from the storage unit 6 is compressed information, the expansion unit 7 expands the PCM-coded information; when the read PCM-coded information is not compressed information, the expansion unit 7 outputs the PCM-coded information without changing it.

Reference numerals 8a to 8n are transcoders or transconverters. These transcoders convert information read out from the storage unit 6 into codes suitable for different rules, respectively. Reference numeral 9 denotes a selection unit. This selection unit 9 selects one of the plurality of transcoders 8a to 8n under control of a control unit 10. The control unit 10 controls the channel control unit 1, the compression unit 5, the storage unit 6, the expansion unit 7, and the selection unit 9.

The control unit 10 compares a coding rule identifier (to be referred to as a storage source coding rule identifier hereinafter) read out from the storage unit 6 with a coding rule identifier (to be referred to as a conversion destination coding identifier hereinafter) of a read destination or destination. If these identifiers coincide with each other, the control unit 10 outputs PCM-coded information output from the expansion unit 7 to the channel control unit 1 through the selection unit 9.

If these identifiers do not coincide with each other, the control unit 10 controls the selection unit 9 to select, e.g., the transcoder 8a, from the transcoders 8a to 8n in accordance with the conversion destination coding rule identifier. At this time, the PCM-coded information output from the expansion unit 7 is code-converted by the transcoder 8a and output to the channel control unit 1 in accordance with the coding rule of the read destination.

Reference numeral 11 denotes an information storage apparatus. This information storage apparatus 11 comprises the channel control unit 1, the compression unit 5, the storage unit 6, the expansion unit 7, the transcoders 8a to 8n, the selection unit 9, and the control unit 10.

Note that bold lines indicate a transfer route for PCM-coded information to be stored and PCM-coded information to be read out, and thin lines indicate a transfer route for control information.

FIG. 2 shows an array of input/output bits of the compression unit 5 and the expansion unit 7. FIG. 2 shows a bit array 12 before compression and after expansion, and a bit array 13 after compression and before expansion.

In the bit array 12 before compression and after expansion, six redundant bits 12a are added to the array before compression to match the rate of a low-rate code (16 kbps) with the rate of an 8-bit array (64 kbps) having an 8-kHz structure, and PCM-coded information is assigned to only two effective bits 12b. The array after compression is the array 13 compressed by removing the redundant bits from the array before compression.

An operation of the information storage apparatus 11 having the above arrangement will be described below. The channel control unit 1 receives an information storage request signal transmitted through the control channel 3 from the switching unit 4 to the information storage apparatus 11 and transmits it via line L1 to the control unit 10.

In this case, the control unit 10 receives the information storage request signal, and then controls the channel control unit 1 so that it receives PCM-coded information and a storage source coding rule identifier transmitted from the switching unit 4. When the PCM-coded information includes redundant bits, the control unit 10 activates the compression unit 5 via line L2 to compress the PCM-coded information transmitted from the channel control unit 1 into information having necessary bits and to output the compressed data. When the PCM-coded information includes no redundant bits, the control unit 10 does not activate the compression unit 5, and the compression unit 5 outputs the PCM-coded information transmitted from the channel control unit 1 without changing it.

For this reason, the storage unit 6 stores compressed PCM-coded information and a storage source coding rule identifier thereof or non-compressed PCM-coded information and an storage source coding identifier thereof.

When information read request signal and a conversion destination coding identifier are transmitted from the switching unit 4 to the information storage apparatus 11, the control unit 10 reads out the storage source coding rule identifier from the storage unit 6 via line L3. When the readout PCM-coded information is compressed PCM-coded information, the control unit 10 activates the expansion unit 7 via line L4 to expand the PCM-coded information. When the readout PCM-coded information is not compressed PCM-coded information, the control unit 10 does not activate the expansion unit 7, and the expansion unit 7 passes the read PCM-coded information without changing it.

The control unit 10 compares the read storage source coding rule identifier with the received conversion destination coding rule identifier. If these identifiers coincide with each other, the PCM-coded information output from the expansion unit 7 is transmitted through the channel control unit 1. If these identifiers do not coincide with each other, the control unit 10 controls the selection unit 9 via line L5 to select, e.g., the transcoder 8a, in accordance with the source coding rule identifier and the destination coding rule identifier.

Therefore, the PCM-coded information output from the expansion unit 7 is code-converted by the selected transcoder 8a, and the PCM-coded information having the coding rule of the read destination can be output to the channel control unit 1 through the selection unit 9. In this manner, even when PCM-coded information is transmitted through the channel control unit 1, communication quality can be prevented from being degraded.

The communication network using the digital synchronous transfer mode (STM), and the CCITT No. 7 signal system for transmitting/receiving control information have been described above. However, the present invention is not limited to this embodiment. That is, when the present invention is applied to a network using an asynchronous transfer mode (ATM), a channel control unit can easily have a function of transmitting/receiving PCM-coded information transmitted on the ATM network and PCM coding rule information corresponding to this PCM-coded information.

As has been described above, according to the information storage apparatus of the present invention, when the information storage apparatus is applied to a digital channel in which pieces of information having different coding rules are present, a code conversion rule can be selected in correspondence with the coding rule of a storage source and the coding rule of a read destination. For this reason, communication quality equal to that obtained when direct communication is performed between a storage source and a read destination can be assured.

The present invention can prevent degradation of communication quality caused by repetition of redundant code conversion performed when information is stored and read out.

In this embodiment, although a plurality of transcoders are used, only one transcoder, e.g., the transcoder 8a may be used. In this case, the selection unit 9 is not required. In this embodiment, although the transcoders 8a to 8n are selected using the selection unit 9, the following arrangement may be used. That is, the selection unit 9 is omitted, the output sides of the transcoders 8a to 8n are commonly connected to the channel control unit 1, and signals for enabling/disabling the transcoders 8a to 8n are directly sent to the transcoders 8a to 8n. Alternatively, the selection unit 9 may be arranged on the input sides of the transcoders 8a to 8n.

What is claimed is:

1. In a digital communication network in which pieces of audio information are encoded using different PCM coding rules, an information storage apparatus comprising:

a control means for receiving an information storage request signal with a coding rule identifier of a source and an information read request signal transmitted with a coding rule identifier of a read destination;

a storage unit for storing PCM-coded audio information to be transmitted and a coding rule identifier of the PCM-coded audio information in correspondence with each other, when said control means receives the information storage request signal; and at least one transconverter for respectively converting PCM-coded audio information read from said storage unit into code-converted PCM-coded audio information having a same coding rule as the coding rule of the read destination;

said control means including a comparator which compares the coding rule identifier read from said storage unit with the coding rule identifier of the read destination, when said control means receives the information read request signal transmitted along with the coding rule identifier of the read destination, so that if the coding rule identifier read from said storage unit coincides with the coding rule identifier of the read destination, the PCM-coded audio information read from said storage unit is transmitted without code conversion, and if the coding rule identifier read from said storage unit does not coincide with the coding rule identifier of the read destination, said PCM-coded audio information is transmitted through a selected one of said at least one transconverter to convert said PCM-coded audio information into said code-converted PCM-coded audio information.

2. An apparatus according to claim 1, further comprising a compression unit and an expansion unit whereby, when a PCM-coded audio information received through a channel includes redundant data, said compression unit removes the redundant data to produce compressed audio data which is stored in said storage unit, and the compressed audio data read out from said storage unit is expanded by the expansion unit and output.

3. In a digital communication network in which pieces of audio information are encoded using different PCM coding rules are present, an information storage apparatus comprising:

a control means for receiving an information storage request signal with a coding rule identifier of the source and an information read request signal transmitted with a coding rule identifier of a read destination;

a storage unit for storing PCM-coded audio information to be transmitted and a coding rule identifier of the PCM-coded audio information in correspondence with each other, when said control means receives the information storage request signal;

a plurality of transconverters for respectively converting PCM-coded audio information read from said storage unit into code-converted PCM-coded audio information having a same coding rule as the coding rule of the read destination; and a selection unit for selecting one of said plurality of transconverters under control of said control means;

said control means including a comparator which compares the coding rule identifier read from said storage unit with the coding rule identifier of the read destination, when said control means receives the information read request signal transmitted along with the coding rule identifier of the read destination, so that if the coding rule identifier read from said storage unit coincides with the coding rule identifier of the read destination, the PCM-coded audio information read from said storage unit is transmitted without code conversion, and if the coding rule identifier read from said storage unit does not coincide with the coding rule identifier of the read destination, said PCM-coded audio information is transmitted through said selected one of said plurality of transconverters to convert said PCM-coded audio information into said code-converted PCM-coded audio information.

4. An apparatus according to claim 3, further comprising a compression unit and a expansion unit whereby, when a PCM-coded audio information received through a channel includes redundant data, said compression unit removes the redundant data to produce compressed audio data which is stored in said storage unit, and the compressed audio data read out from said storage unit is expanded by the expansion unit and output.

* * * * *